UNITED STATES PATENT OFFICE.

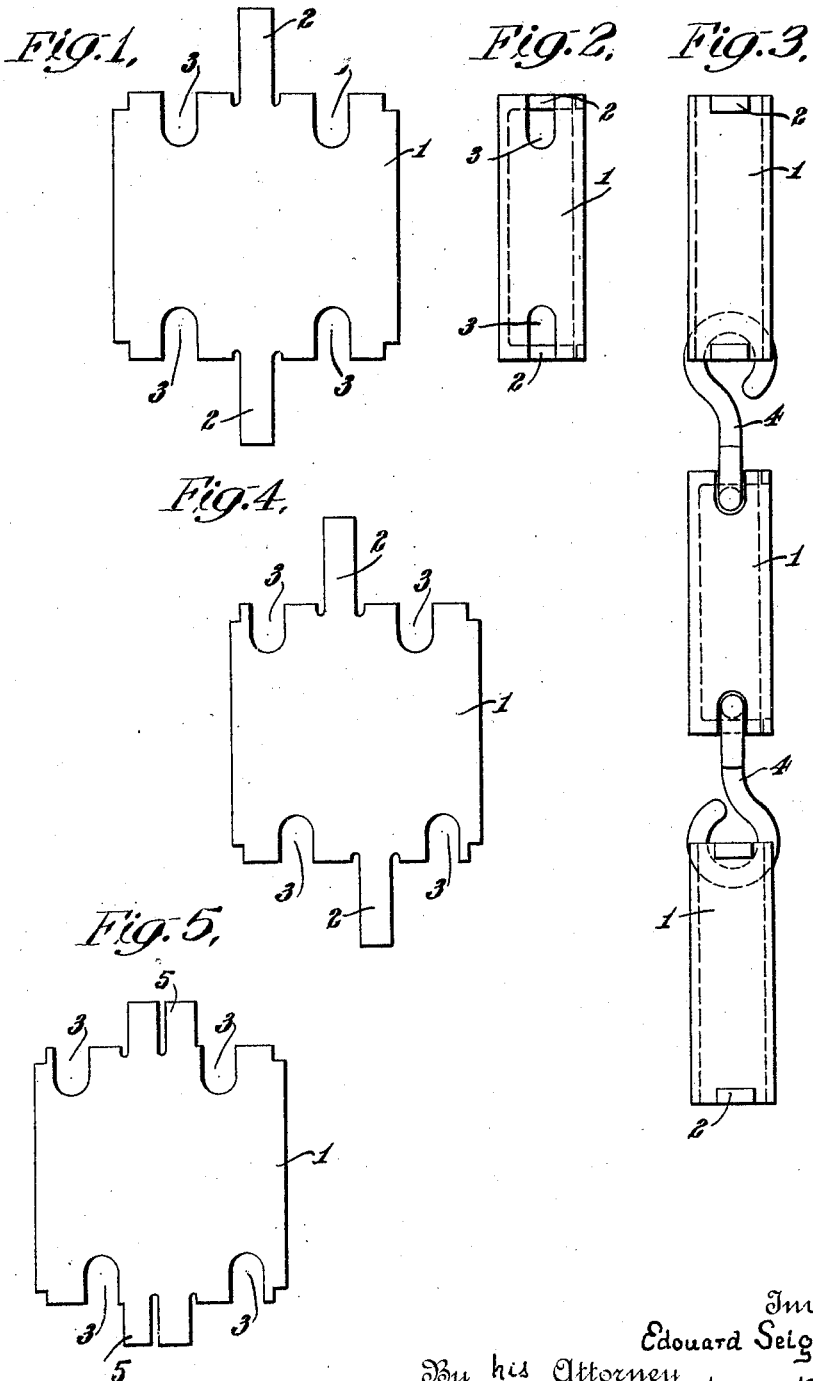

EDOUARD SEIGNOL, OF NEUILLY-SUR-SEINE, FRANCE.

COUPLING-CHAIN.

1,401,194.  Specification of Letters Patent.  Patented Dec. 27, 1921.

Application filed January 23, 1920. Serial No. 353,643.

*To all whom it may concern:*

Be it known that I, EDOUARD SEIGNOL, a citizen of the Republic of France, residing at Neuilly-sur-Seine, France, have invented certain new and useful Improvements in Coupling-Chains, of which the following is a specification.

The present invention relates to links for chains adapted for use as flexible shaft couplings, and to the process of making such links.

The object of the invention is to produce chain links of cylindrical shape and adapted to be connected together by hooks of ordinary design, without requiring the drilling of holes in said links or the riveting of pins thereto.

The invention will be better understood by reference to the accompanying drawing in which:

Figure 1 shows the blank from which the link is shaped;

Fig. 2 is a view of the completed link;

Fig. 3 shows a chain comprising a number of such links connected by means of hooks of a current type;

Figs. 4 and 5 are views similar to Fig. 1, illustrating different shapes of blanks.

In carrying out the invention the blank 1 of sheet metal, which may be cut or stamped, is provided at each end with a projection or tongue 2 (Fig. 1) and notches 3, 3 on both sides of each tongue. The blank 1 is rolled so that it assumes a cylindrical shape and the tongues 2 are folded at right angles to the cylindrical wall, as shown in Fig. 2. The notches 3 of each pair are then on opposite sides of the cylindrical link and provide the necessary holes for receiving the hooks 4, whereas the bent portions 2, 2 engage the hooks and constitute advantageous substitutes for the usual riveted pins.

In use, coupling chains of this type are subjected to practically no longitudinal stresses, and the transverse or torsional stresses are exerted only on the sides of the holes 3, so that the bent tongues 2 adequately answer the purpose of holding the links and hooks in engagement with one another.

It will be seen that substantially all the driving torque is transmitted by the engagement between the wire hooks and the sides of the notches 3, the tongues 2, which are naturally weak, being practically unstressed.

As shown in Fig. 3, the successive links and hooks are usually arranged at right angles to each other, but it is obvious that by suitably positioning the notches 3, 3 different arrangements can be obtained, which, in some cases, may be used to advantage. Fig. 4 illustrates by way of example a non-symmetrical blank adapted to form a link wherein the holes 3—3 will not be in the same diametral plane.

The tongues 2 may have only half the length necessary for spanning the cylindrical links, so that the transverse members will be constituted by two tongues bent at right angles to the cylindrical wall. In this case, of course, two tongues should be provided at each end of the blank, as shown in Fig. 5 which illustrates a non-symmetrical blank provided with half-length tongues 5.

It will be understood that other changes may be made in the shape and structure of the improved coupling chain links without departing from the scope of the invention as set forth in the appended claims.

I claim:

1. A chain adapted for use in flexible shaft coupling, comprising wire hook members alternating with links, each link comprising a hollow cylindrical body formed by rolling a sheet metal blank and having a hook retaining eye at each end of said body formed by an integral bent projection traversing the end of the link in the plane of the edge of the blank and a pair of notches in the latter, the sides of which notches are adapted to engage the hooks in such a manner as to transmit substantially all the torque of the shaft thereto.

2. In a flexable shaft of the kind consisting of alternate wire hook members and cylindrical links, a link comprising a hollow cylindrical body formed by rolling a sheet metal blank having at each end a pair of notches adapted to engage and transmit rotation to a wire hook, and a transverse member at each end of said body and integral therewith, said members being formed by bending projections integral with said blank at right angles to the cylindrical wall of said body and into the plane of the edge of the blank.

In testimony whereof I affix my signature.

EDOUARD SEIGNOL.